Patented June 2, 1925.

1,540,448

UNITED STATES PATENT OFFICE.

ROBERT E. WILSON, OF CHICAGO, ILLINOIS, ASSIGNOR TO THE BALTIMORE GAS ENGINEERING CORPORATION, OF BALTIMORE, MARYLAND, A CORPORATION OF MARYLAND.

CATALYTIC AND ADSORBENT MATERIAL.

No Drawing. Application filed March 10, 1922, Serial No. 542,791. Renewed October 1, 1924.

*To all whom it may concern:*

Be it known that I, ROBERT E. WILSON, a citizen of the United States, residing at Chicago, in the county of Cook and State of Illinois, have invented certain new and useful Improvements in Catalytic and Adsorbent Material, of which the following is a specification.

This application is a continuation in part of my application, Ser. No. 354,690, filed January 28, 1920.

In the above application I have described new metallic hydroxide gels and novel processes of making the gels.

Among the objects of this invention is to produce a metallic substance from the gels described in my former application, said metallic substance being highly porous, highly infrangible and pyrophoric and possessing very valuable catalytic and adsorbent properties. The pores of the metallic substance are ultra-microscopic.

In preparing these pyrophoric metals I take the gel, which is essentially a porous skeleton of a metallic compound and usually a partially hydrated oxide of a metal, and slowly dehydrate the material and subject the dehydrated substance to the action of reducing agents, preferably reducing gases such as hydrogen or carbon monoxide. I also prefer to dilute this reducing agent with non-reducing gas, such as nitrogen, at the beginning of the reduction in order to avoid excessive local temperatures at the surface of the metal which would tend to sinter the mass together and thus reduce the value of the product for catalytic purposes by lessening the amount of surface exposed or changing its structure. I have found it desirable in some cases to start the reduction by using as low as 2% hydrogen in the reduction mixture and gradually increasing the percentage of hydrogen as the reduction approaches completion, the resulting product being more active than that prepared by first treating with higher concentrations of reducing gas. When operating with low concentrations of reducing gas a slightly higher initial temperature is usually required to start the reduction. Reduction starts below 400° C. when pure reducing gas is used but is usually not complete until about 600° C. is reached.

A specific example of preparing this new material consists in treating a ferric hydroxide gel, such as disclosed in the above application, starting with a mixture of gases comprising a very small quantity of hydrogen diluted with a large quantity of inert gas at a temperature in the neighborhood of 400° C., and finally completing the reduction with pure hydrogen at approximately 600° C. For certain purposes it is best not to attempt to complete the reduction, but merely to remove all the oxygen possible at a given maximum temperature.

It is to be understood that this invention is not limited to the production of pyrophoric iron by the method disclosed in the specific example set forth herein but that it also embraces the production of very finely divided metallic iron by other similar means from ferric hydroxide gel and also of other metals which have gel-like hydroxides similar to that of iron, such as aluminum, chromium, calcium, copper, nickel, cobalt, etc.

In general, I prefer to employ the pyrophoric metal in the form of small granules. Among the uses for which my new products are appropriate are as catalysts in the synthesis of ammonia from hydrogen and nitrogen, the oxidation of $SO_2$ to $SO_3$ and the removal or oxidation of sulfur compounds in gases. These new products may be advantageously used to replace ordinary finely divided iron or the corresponding other metals in practically all processes where the catalytic influence of the metals is desired. My new products may also advantageously be used to adsorb materials from solutions, especially from non-aqueous solutions.

In the following claims where the expressions "gas" and "gases" are used, I intend to include gaseous substances such as the vapors of solids or liquids as well as the substances which are gases at ordinary temperatures and also mixtures of such substances with each other or with gases.

This invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. Highly porous, highly infrangible, granular material comprising essentially metal, the pores of which are ultra-microscopic.

2. Highly porous material in coarse granules, comprising essentially pyrophoric metal, the pores of which are ultra-microscopic.

3. Highly porous, highly infrangible material in coarse granules, comprising essentially pyrophoric iron, the pores of which are ultramicroscopic.

4. Highly porous, highly infrangible, catalytic material in coarse granules comprising essentially pyrophoric metal, the pores of which are ultramicroscopic.

5. Highly porous, catalytic material in coarse granules, comprising essentially pyrophoric iron, the pores of which are ultramicroscopic.

6. In a process of making a metal in a highly porous form, dehydrating and reducing a gel-like, partially-hydrated oxide of the metal.

7. In a process of making a metal in a highly porous form, reducing a gel-like oxide of the metal by treating with a reducing gas highly diluted with non-reducing gas and increasing the concentration of the reducing gas as the reduction of the metallic substance is continued.

8. In a process of making a metal in a highly porous form, reducing a gel-like oxide of the metal by treating with hydrogen highly diluted with nitrogen and increasing the concentration of the hydrogen as the reduction of the metallic substance is continued.

9. In a process of making a metal in a highly porous form, dehydrating a gel-like, partially-hydrated oxide of the metal and then treating with a reducing gas highly diluted with non-reducing gas and increasing the concentration of the reducing gas as the reduction of the metallic substance is continued.

10. In a process of making a metal in a highly porous form, dehydrating a gel-like, partially-hydrated oxide of the metal and then treating with hydrogen highly diluted with nitrogen and increasing the concentration of the hydrogen as the reduction of the metallic substance is continued.

11. In a process of making highly active pyrophoric metal, the pores of which are microscopic, dehydrating granules of a gel-like, partially-hydrated oxide of the metal and then treating with a reducing gas highly diluted with non-reducing gas and increasing the concentration of the reducing gas as the reduction of the metallic substance is continued.

12. In a process of making highly active pyrophoric metal, the pores of which are microscopic, dehydrating granules of a gel-like, partially-hydrated oxide of the metal and then treating with hydrogen highly diluted with nitrogen and increasing the concentration of the hydrogen as the reduction of the metallic substance is continued.

13. In a process of making a metal in a highly porous form, reducing a gel-like oxide of the metal by treating first with reducing gas of low concentration and then with reducing gas of high concentration.

14. In a process of making iron in a highly porous form, dehydrating and reducing a gel-like, partially-hydrated iron oxide.

15. In a process of making iron in a highly porous form, reducing a gel-like iron oxide by treating with a reducing gas highly diluted with non-reducing gas and increasing the concentration of the reducing gas as the reduction of the metallic substance is continued.

16. In a process of making iron in a highly porous form, reducing a gel-like iron oxide by treating with hydrogen highly diluted with nitrogen and increasing the concentration of the hydrogen as the reduction of the metallic substance is continued.

17. In a process of making iron in a highly porous form, dehydrating a gel-like, partially-hydrated iron oxide and then treating with hydrogen highly diluted with nitrogen and increasing the concentration of the hydrogen as the reduction of the metallic substance is continued.

18. In a process of making highly active pyrophoric iron, the pores of which are microscopic, dehydrating granules of a gel-like, partially-hydrated iron oxide and then treating with a reducing gas highly diluted with a non-reducing gas and increasing the concentration of the reducing gas as the reduction of the metallic substance is continued.

19. In a process of making iron in a highly porous form, reducing a gel-like iron oxide by treating first with reducing gas of low concentration and then with reducing gas of high concentration.

ROBERT E. WILSON